US010212328B2

(12) United States Patent
Krishnakumar et al.

(10) Patent No.: US 10,212,328 B2
(45) Date of Patent: Feb. 19, 2019

(54) INTELLIGENT PRESENTATION OF SURVEILLANCE INFORMATION ON A MOBILE DEVICE

(71) Applicant: Avaya Inc., Basking Ridge, NJ (US)

(72) Inventors: Anjur Sundaresan Krishnakumar, Princeton, NJ (US); Shalini Yajnik, Berkeley Heights, NJ (US)

(73) Assignee: Avaya Inc., Basking Ridge, NJ (US)

( * ) Notice: Subject to any disclaimer, the term of this patent is extended or adjusted under 35 U.S.C. 154(b) by 355 days.

(21) Appl. No.: 14/702,283

(22) Filed: May 1, 2015

(65) Prior Publication Data

US 2016/0323498 A1    Nov. 3, 2016

(51) Int. Cl.
H04N 7/18 (2006.01)
H04N 5/232 (2006.01)
H04W 4/02 (2018.01)

(52) U.S. Cl.
CPC ..... *H04N 5/23206* (2013.01); *H04N 5/23293* (2013.01); *H04W 4/027* (2013.01)

(58) Field of Classification Search
CPC .......... H04N 5/23206; H04N 5/23293; H04W 4/027
USPC .......................................................... 348/143
See application file for complete search history.

(56) References Cited

U.S. PATENT DOCUMENTS

| 2010/0026809 | A1* | 2/2010 | Curry | H04N 5/222 348/157 |
| 2011/0054780 | A1* | 3/2011 | Dhanani | G01C 21/26 701/465 |
| 2011/0190952 | A1* | 8/2011 | Goldstein | H02J 3/32 700/291 |
| 2012/0019659 | A1* | 1/2012 | Warzelhan | H04N 7/18 348/143 |
| 2012/0276954 | A1* | 11/2012 | Kowalsky | H04N 5/2252 455/556.2 |
| 2014/0050118 | A1* | 2/2014 | Chow | H04W 48/08 370/254 |

* cited by examiner

Primary Examiner — Allen C Wong

(57) ABSTRACT

Embodiments disclosed herein provide methods, systems, and computer readable storage media for intelligently presenting surveillance information on a mobile device. In a particular embodiment, a method provides receiving video streams each comprising video captured of a location of a premises under surveillance. The method further provides determining a device location of the mobile device in the premises and selecting at least one video stream of the video streams based on the device location and the location captured in the video of each video stream. The method also provides transferring the at least one video stream to the mobile device.

20 Claims, 9 Drawing Sheets

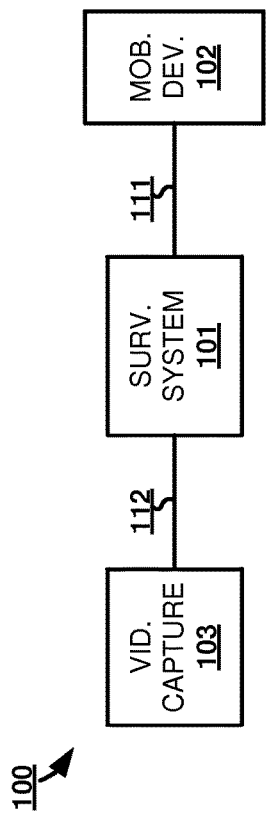
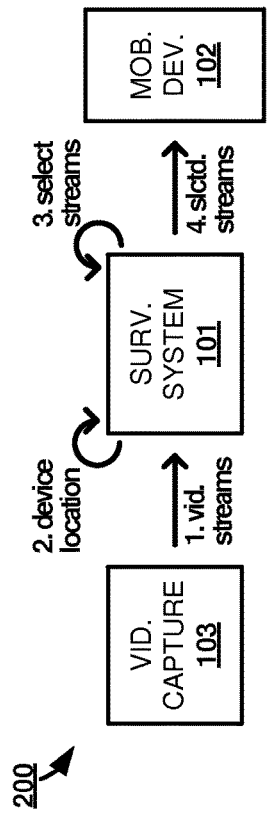
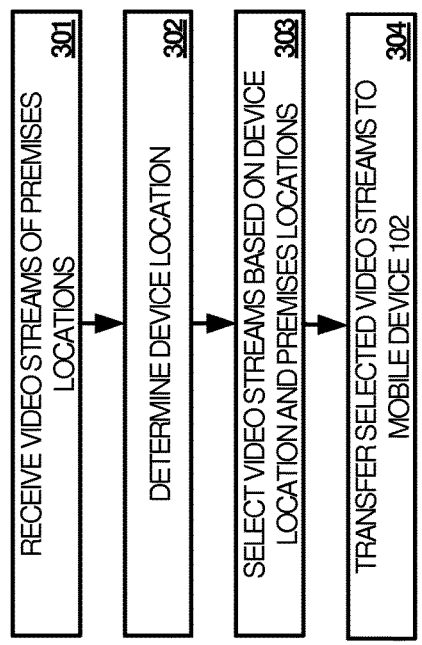

INTELLIGENT PRESENTATION OF SURVEILLANCE INFORMATION ON A MOBILE DEVICE

TECHNICAL BACKGROUND

Video surveillance systems have long been able to capture video of various locations around a premises. That video may then be displayed to a user, such as a security guard, via one or more displays. For example, a security guard may be located in a command room and is able to view live video feeds captured from video cameras at different locations of a premises for which the security guard is responsible. That security guard, or another, may be dispatched to a location at the premises based on something viewed in one of the displayed video feeds, or for some other reason, such as routine patrols.

Regardless of the reason for patrolling, the patrolling security guard does not have the benefit of the video feeds while on patrol. Therefore, that security guard is only aware of the space that can be captured by their own senses. The security guard is unaware of threats that may be around corners, or otherwise not visible to the patrolling guard.

OVERVIEW

Embodiments disclosed herein provide methods, systems, and computer readable storage media for intelligently presenting surveillance information on a mobile device. In a particular embodiment, a method provides receiving video streams each comprising video captured of a location of a premises under surveillance. The method further provides determining a device location of the mobile device in the premises and selecting at least one video stream of the video streams based on the device location and the location captured in the video of each video stream. The method also provides transferring the at least one video stream to the mobile device.

In some embodiments, the method provides determining a second device location of the mobile device in the premises, selecting at least one second video stream of the video streams based on the second device location and the location captured in the video of each video stream, and transferring the at least one second video stream to the mobile device.

In some embodiments, the method further provides receiving environmental sensor information for locations captured in video of each of the at least one video streams and transferring the environmental information to the mobile device.

In some embodiments, determining the device location comprises determining a wireless access point at the premises to which the mobile device is connected, wherein a location of the wireless access point indicates the device location.

In some embodiments, the method provides determining the device location includes determining a location of the premises towards which the mobile device is moving and selecting the at least one video stream comprises determining which first ones of the video streams comprise video captured of the location of the premises towards which the mobile device is moving.

In some embodiments, the method provides transferring to the mobile device an indication that a one video stream of the first ones of the video streams is to be displayed larger than other displayed ones of the at least one video stream.

In some embodiments, the at least one video stream further includes a first video stream comprising video captured of the device location.

In some embodiments, the method provides displaying the at least one video stream at a separate location away from the device location.

In some embodiments, the mobile device comprises a session initiation protocol (SIP) user agent and the at least one video stream is transferred to the SIP user agent.

In another embodiment, a surveillance system for intelligently presenting surveillance information on a mobile device is provided. The system includes a communication interface configured to receive video streams each comprising video captured of a location of a premises under surveillance. The system further includes a processing system configured to determine a device location of the mobile device in the premises and select at least one video stream of the video streams based on the device location and the location captured in the video of each video stream. The communication interface is further configured to transfer the at least one video stream to the mobile device.

In some embodiments, the processing system is configured to determine a second device location of the mobile device in the premises and select at least one second video stream of the video streams based on the second device location and the location captured in the video of each video stream and the communication interface configured to transfer the at least one second video stream to the mobile device.

In some embodiments, the surveillance system further includes a sensor interface configured to receive environmental sensor information for locations captured in video of each of the at least one video streams and the communication interface configured to transfer the environmental information to the mobile device.

In some embodiments, the processing system is configured to determine the device location comprises the processing system configured to determine a wireless access point at the premises to which the mobile device is connected, wherein a location of the wireless access point indicates the device location.

In some embodiments, the processing system is configured to determine the device location includes determining a location of the premises towards which the mobile device is moving. The processing system configured to select the at least one video stream comprises the processing system configured to determine which first ones of the video streams comprise video captured of the location of the premises towards which the mobile device is moving.

In some embodiments, the communication interface is configured to transfer to the mobile device an indication that a one video stream of the first ones of the video streams is to be displayed larger than other displayed ones of the at least one video stream.

In some embodiments, the at least one video stream further includes a first video stream comprising video captured of the device location.

In some embodiments, the surveillance system further comprises a display at a separate location away from the device location configured to display the at least one video stream.

In some embodiments, the mobile device comprises a session initiation protocol (SIP) user agent and the at least one video stream is transferred to the SIP user agent.

In some embodiments, the mobile device is configured to receive the at least one video stream and display the at least one video stream.

In yet another embodiment, a method of operating a mobile device to intelligently present surveillance information is provided. The method provides receiving at least one video stream from a surveillance system. The surveillance system selects the at least one video stream from video streams, each comprising video captured of a location of a premises under surveillance, based on a device location of the mobile device and the location captured in the video of each video stream. The method further provides displaying the at least one video stream to a user.

BRIEF DESCRIPTION OF THE DRAWINGS

FIG. 1 illustrates a surveillance environment in an operational scenario of intelligently presenting surveillance information on a mobile device.

FIG. 2 illustrates an operational scenario of intelligently presenting surveillance information on a mobile device.

FIG. 3 illustrates a method for intelligently presenting surveillance information on a mobile device.

DETAILED DESCRIPTION

Figure 4:
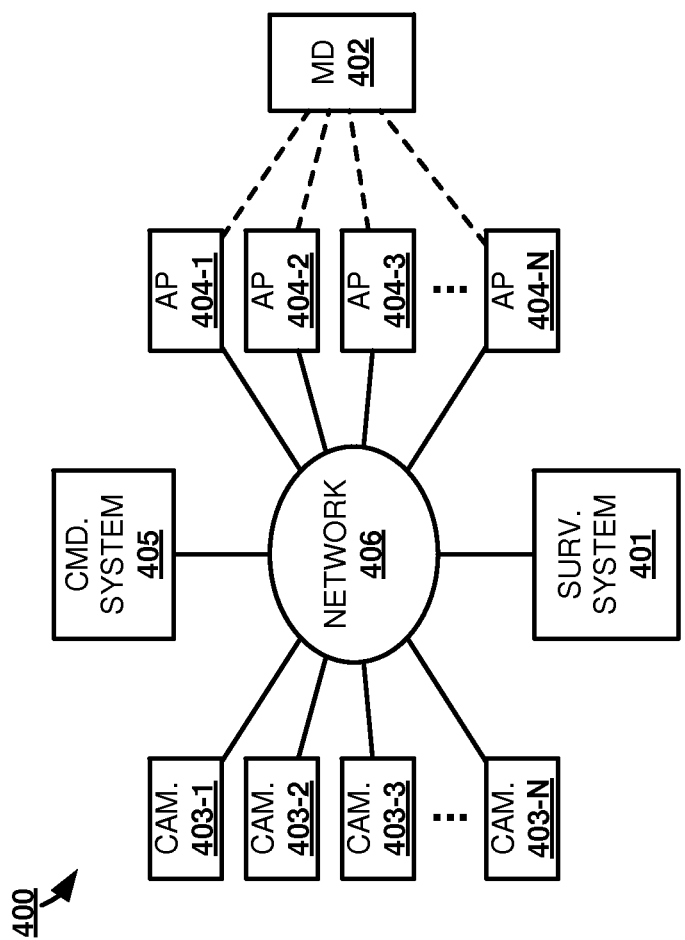
FIG. 4 illustrates a surveillance environment in an operational scenario of intelligently presenting surveillance information on a mobile device.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Video surveillance systems may capture video from numerous cameras that capture video of various locations under surveillance. The locations may be positioned in and around any type of premises, such as one or more buildings, outdoor areas, and combinations thereof. The captured video may be fed back to a display system where an interested user, such as a security guard, can view one or more of the video feeds in real-time to monitor the premises without having to physically visit each location captured by the cameras. As convenient as it may be to sit in one location viewing the various video feeds, some situations may exist where physical patrol of the premises is desired or necessary.

In those cases, modern mobile devices, including smartphones, tablets, laptops, etc., are capable of receiving and displaying video. In some cases, the video can be streamed to a device, which allows live video feeds to be viewed in real-time. Thus, in the embodiments described below, a mobile device is configured to receive real-time surveillance video feeds and display them to a user. In the case of a security guard, one or more of the video feeds may be streamed to and viewed on a mobile device carried by the security guard while patrolling the premises. Moreover, since there may be many video feeds of many different locations, the embodiments herein automatically select which video feed(s) should be presented to the guard without the guard, or other user, having to manually find and select relevant video feeds for presentation.

FIG. 1 illustrates surveillance environment 100. Surveillance environment 100 includes surveillance system 101, mobile device 102, and video capture system 103. Surveillance system 101 and video capture system 103 communicate over communication links 112. Surveillance system 101 and mobile device 102 communicate over wireless link 111.

In operation, surveillance system 101 receives video captured in real time by cameras, or other video capture devices, of video capture system 103. The video is captured of various locations throughout a premises into which surveillance environment 100 is installed. Surveillance system 101 is able to then stream one or more of the videos to mobile device 102. To determine which video stream(s) should be transferred to mobile device 102, surveillance system 101 determines where mobile device 102 is located and selects video streams most relevant to that location. Mobile device 102 is therefore able to present the most relevant surveillance video streams to its user in real time without requiring user input selecting the video.

FIG. 2 illustrates operation 200 of surveillance environment 100 to intelligently present surveillance information on a mobile device. At step 1, surveillance system 102 receives video streams from video capture system 103. Each video system includes video captured of a location of a premises under surveillance. The premises may be one or more buildings, the area surrounding the building, an outdoor area with or without structures, or any other type of location that may be covered by video surveillance—including combinations thereof. The locations may be anywhere, indoor or outdoor, that a camera or other type of video capture device may be placed. In some cases, multiple video streams may capture the same location at different angles or video capture of one location may overlap with video captured of another location.

At step 2, surveillance system 101 determines a device location of mobile device 102 in the premises. In one example, the premises may be covered with wireless network access by multiple wireless access points, such as Wi-Fi access nodes. The device location may then be determined by identifying which of the wireless network access points mobile device 102 is using to communicate with surveillance system 101. The device location is then determined to be a location nearby the access point (e.g. a location within the coverage area of the access point or, more specifically, a location of the premises that can be occupied by mobile device 101 or its user). Alternative methods of location determination may also be used, such as receiving Global Positioning System (GPS) coordinates determined by mobile device 102, triangulation from multiple wireless access nodes within range of mobile device 102, radio frequency identifier (RFID) tags (or other form of near field communication) throughout the premises that identify corresponding locations to mobile device 102 when mobile device 102 is close enough to read the tags (either read by device 102 and transferred to surveillance system 101 or device 102 may be sensed by a near field communication device at a location and that near field device reports device 102's location to system 101), or any other way in which a system can determine the location of a wireless device within a premises. In some examples, the device location may further include a direction of movement for the device.

Once the device location is known, at step 3, surveillance system 101 selects at least one video stream of the video streams based on the device location and the location captured in the video of each video stream. In one example, a location shown in the at least one video stream may be include the device location. In other examples, one or more locations in the at least one video may include locations around the device location. Video of these surrounding locations may benefit the user by showing the user conditions around the device location (e.g. the at least one video may inform the user of a dangerous condition around a corner). Alternative methods for determining which of the at least one video streams may be most relevant to the user of device 102 at the device location may also be used.

At step 4, surveillance system 101 transfers the at least one video stream to mobile device 102. As mobile device 102 receives the at least one video stream, the video of each stream is presented to the user of mobile device 102 in real time. Each of the steps in operation 200 may be performed continually until the video streams are no longer needed by mobile device 102. Thus, as mobile device 102 moves, step 2 updates the device location, step 3 re-selects the at least one video stream based on the updated location, and step 3 transfers the re-selected at least one video stream to device 102 in place of the previously selected at least one video stream. This continual operation allows for automatic presentation of live surveillance video streams most relevant to the user of device 102 as the user moves with device 102 throughout the premises.

FIG. 3 illustrates a method 300 of operating surveillance system 101 for intelligently presenting surveillance information on mobile device 102. The method provides receiving video streams each comprising video captured of a location of a premises under surveillance (301). The method also provides determining a device location of mobile device 101 in the premises (302) and selecting at least one video stream of the video streams based on the device location and the location captured in the video of each video stream (303). The method then further provides transferring the at least one video stream to mobile device 101 (304).

The steps of method 300 may be performed in various orders, including concurrently, to ensure the most relevant video is transferred to mobile device 102 for presentation to mobile device 102's user. For example, the video streams my be continually received by surveillance system 101 or may only be received when mobile device 102 requests video streams (e.g. executes an application that requests the video stream(s)). Likewise, to save network bandwidth, only the video streams currently being transferred to mobile device 101, or another mobile device, may be received by surveillance system 101.

Referring back to FIG. 1, surveillance system 101 comprises a computer system and communication interface for transferring and receiving video stream information (e.g. video and data associated with the video). Surveillance system 101 may also include other components such as a router, server, data storage system, and power supply. Surveillance system 101 may reside in a single device or may be distributed across multiple devices.

Mobile device 102 comprises communication circuitry and processing circuitry. The communication circuitry may include wired communication components and/or wireless communication components, such as an amplifier, filter, modulator, and signal processing circuitry. Mobile device 102 may also include a user interface, memory device, software, or some other communication components. Mobile device 102 may be a telephone, tablet, watch, computer, e-book, mobile Internet appliance, network interface card, media player, game console, or some other communication apparatus—including combinations thereof.

Video capture system 103 includes video cameras, infrared video cameras, night vision video cameras, or some other type of video capture element—including combinations thereof. Video capture system 103 may further include communication interfaces for transferring video stream information to and receive information from surveillance system 101. Elements of video capture system 103 are dispersed throughout a premises to capture video of various locations of the premises.

Wireless link 111 uses the air or space as the transport media. Wireless link 111 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication links 112 use metal, glass, air, space, or some other material as the transport media. Communication links 112 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication links 112 could be direct links or may include intermediate networks, systems, or devices.

FIG. 4 illustrates surveillance environment 400. Surveillance environment 400 includes surveillance system 401, mobile device 402, video cameras 403, wireless access points 404, command system 405, and communication network 406. Mobile device 402 accesses communication network 406 via wireless access points 404. While elements 401, 403, and 405 are shown directly connected to communication network 406, any of those elements may connect through wireless access points 404 as well.

In operation, command system 405 is located in a room or area of a premises, such as a office building, where users, such as security guards or other interested parties, can view video streams captured by cameras 403 on one or more displays of command system 405. Surveillance system 401 handles the receipt of video streams from cameras 403 and distribution of those video streams to command system 405 for display. The cameras are located throughout the premises to capture video of various areas for security purposes or otherwise. Surveillance system 401 may further store recordings of the video streams to a storage system located in surveillance system 401 or elsewhere over communication network 406. In some cases, the functionality of surveillance system 401 may be combined with that of command system 405 or the systems may otherwise be co-located.

Surveillance system 401 further includes the capability to transfer video streams to mobile devices, such as mobile device 402. Therefore, should a user need to move about the premises, the user can bring mobile device 402 in order to view real-time video feeds on mobile device 402 while that user is away from command system 405. More specifically, surveillance system 401 determines where mobile device 402 is located in the premises, determines which of the video streams from cameras 403 are most relevant to the user of device 402, and transfers those video streams to device 402 for presentation to the user.

Figure 5:
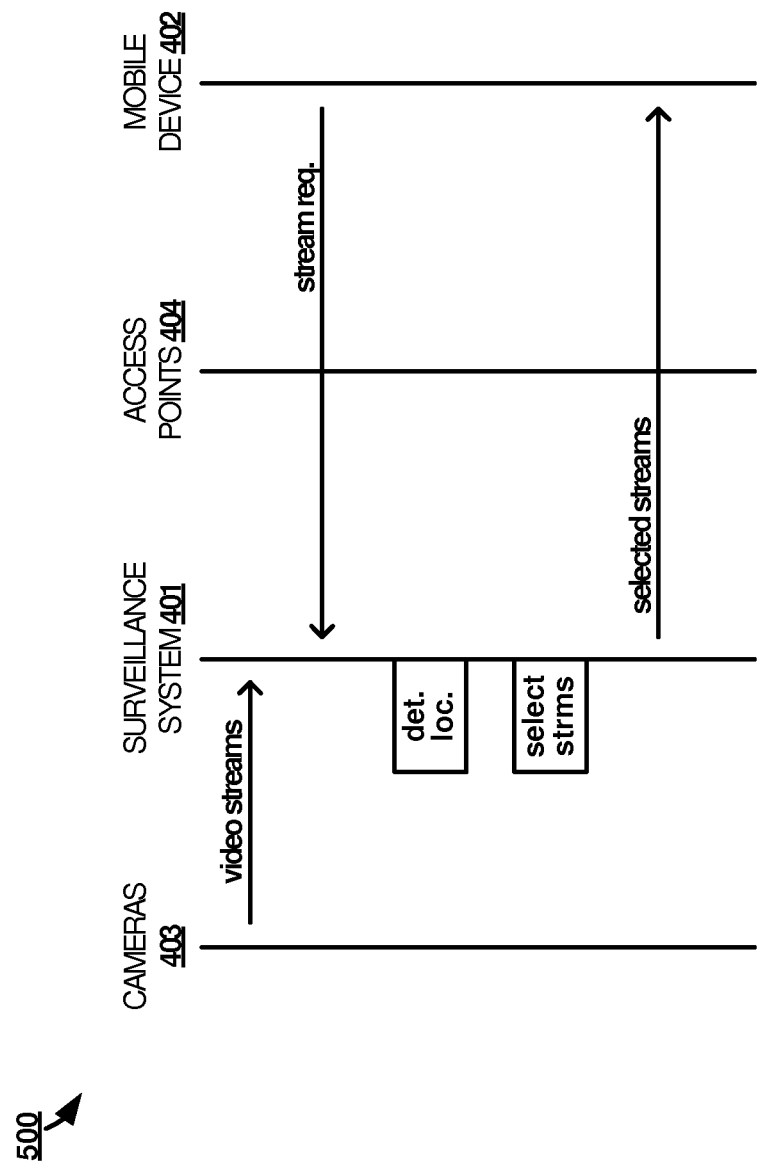
FIG. 5 illustrates an operational scenario of intelligently presenting surveillance information on a mobile device.

FIG. 5 illustrates operation 500 of surveillance environment 400 to intelligently present surveillance information on a mobile device. In real time, surveillance system 401 receives video streams of video captured from cameras 403. Theses streams may be continually sent to surveillance system 401 even when a stream is not being viewed at command system 405 or on mobile device 402. For example, surveillance system 401 may record the video streams for later viewing by a mobile device or on command system 405.

As the video streams are received from cameras 403, mobile device 402 requests video streams from surveillance system 401. This request may be made at the instruction of a video presentation application executing on mobile device 402, which may in turn be acting on an instruction from the user of device 402 to display the video streams. For example, if a security guard leaves the vicinity of command system 405, then the security guard may direct mobile device 403 to display video streams in order to view areas of the premises not currently viewable, such as around corners, behind doors, or through darkness in situations where at least one of cameras 403 are night vision capable.

Surveillance system 401 determines the current location of mobile device 402 at the time of the stream request in order to select the video streams that are relevant to mobile device 102's location. In one example, surveillance system 401 determines which of wireless access nodes 404 mobile device 402 is using to communicate with network 406. Surveillance system 401 then determines a location of the premises where the determined access node is positioned (e.g. references a lookup table of wireless access node locations) and identifies the location of mobile device 402 as a location within a predetermined distance of that position. The predetermined distance may be based on the typical signal range of the wireless access node. Alternative methods of determining mobile device 402's location may also be used and may include receiving location information from mobile device 402 itself. In some cases, the location of mobile device 402 may be tracked continually so that the location is already known at the time of receiving the video stream request from mobile device 402. Furthermore, the location may include additional details, such as direction of movement for mobile device 402, speed of movement for device 402, or other location related information.

Once the location of mobile device 402 is known, surveillance system 401 selects one or more of the video streams to forward along to mobile device 402. The one or more streams may include video of mobile device 402's location, video of areas around mobile device 402's location (e.g. video of areas that mobile device 402 is approaching), or some other video that is relevant to the location of mobile device 402. The selected video streams are then streamed to mobile device 402 and mobile device 402 displays them to its user. If the video streams include audio captured by an audio capture component of cameras 403, then the audio may be transferred to device 402 for presentation as well.

Figure 6:
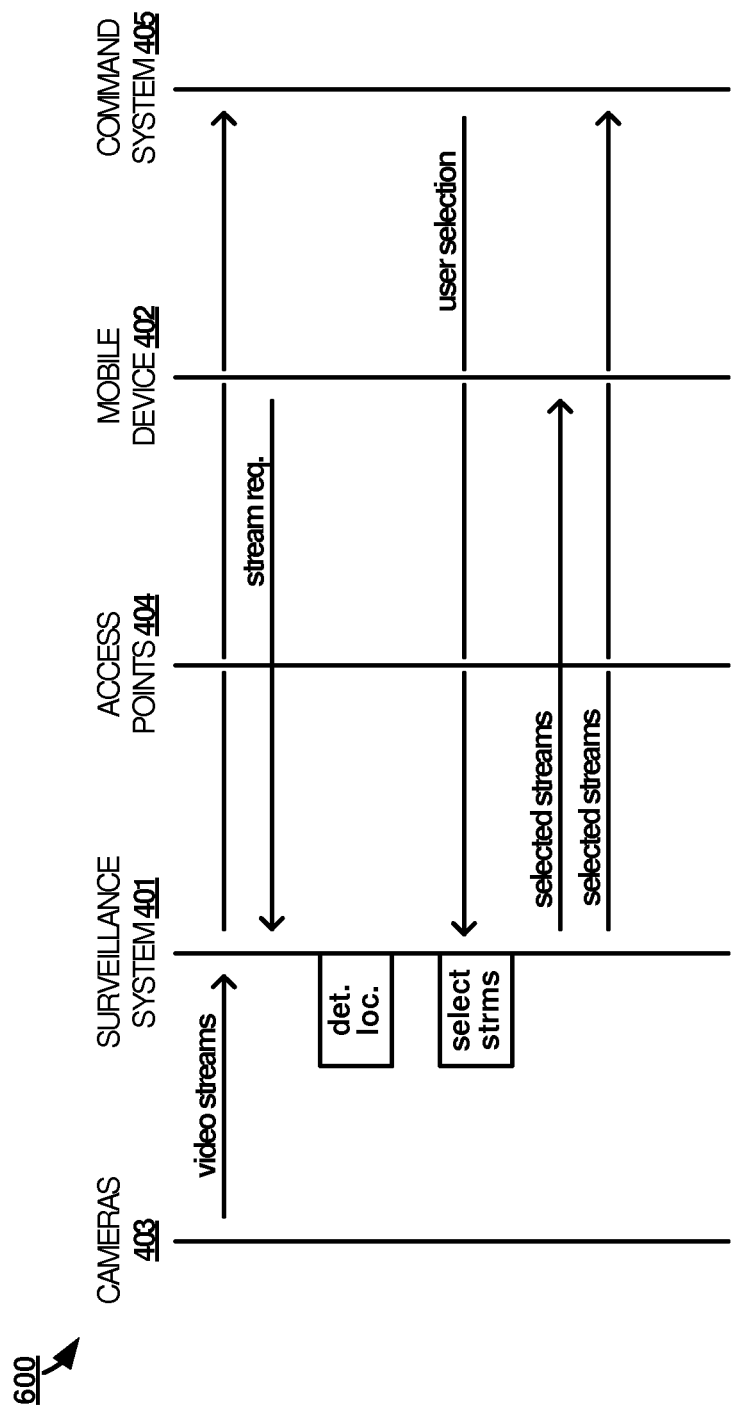
FIG. 6 illustrates an operational scenario of intelligently presenting surveillance information on a mobile device.

FIG. 6 illustrates operation 600 of surveillance environment 400 to intelligently present surveillance information on a mobile device. As in operation 600, video is streamed from cameras 403 to surveillance system 401. In this example, surveillance system 401 also sends the video stream to command system 405 so that users can view the video streams on the display(s) of command system 405. The displays of command system 405 may have enough screen space to display all of the video streams, the video streams may cycle through if there is not enough screen space, or some other method of displaying the video streams may be employed. This display of the video streams by command system 405 allows a user, such as a security guard, to monitor all areas of the premises covered by cameras 403.

Should the user determine that a patrol of the premises outside of the location of command system 405 be desired, a user in possession of mobile device 402 instructs device 402 to request and display video streams relevant to the user's location, which happens to also be the location of mobile device 402. Surveillance system 401 receives a request for video streams from mobile device 402 and, like in operation 500, surveillance system 401 determines the current location of mobile device 402. From that current location, surveillance system 401 selects video streams from cameras 403 that are relevant to the location.

Additionally, in operation 600, a user that remains at command system 405 is able to provide input into command system 405 to select one or more video streams that the command system user believes are relevant to the user with mobile device 402. For example, the user at command system 405 may see something of interest (e.g. as suspicious person) in a particular video feed that would also be of interest to the user with mobile device 402. The video feed of interest is then selected (e.g. via touchscreen selection, mouse click, or otherwise) and a notification of that selection is transferred to surveillance system 401. Upon receiving the notification of the selection, surveillance system 401 may replace one or more of the video streams selected based on the location of mobile device 402 with the one or more video streams selected by the user of command system 405.

The video streams are then transferred to mobile device 402 and displayed to its user. This allows the user of mobile device 402 to view live video while on the move throughout the premises. Additionally, at least an indication of the video streams sent to mobile device 402 is transferred to command system 405. The user(s) at command system 405 are therefore informed about what the user of mobile device 402 is viewing at any given moment. Moreover, the user at command system 405 may be able to enter additional input to change which video streams are transferred to and displayed on mobile device 402, to instruct mobile device 402 to make a particular stream the most prominent stream displayed on mobile device 402, to highlight a portion of a video stream displayed on mobile device 402, to rewind, pause, or replay a portion of a video stream on mobile device 402, or some other input effecting how video streams are displayed on mobile device 402. Information indicating the input is sent to surveillance system 401, which takes any actions necessary for mobile device 402 to comply with the instructions. Additionally, similar input may be received by mobile device 402 from its user. This input may be for the user's own benefit but the input's effect also may be indicated at command system 405 via surveillance system 401 so that users at command system 405 can stay current on what mobile device 402 is displaying.

In further examples, a voice or video call connection may be established between mobile device 402 and command system 405. This allows the users to communicate about what video streams are being presented among other topics that may be useful.

Figure 7:
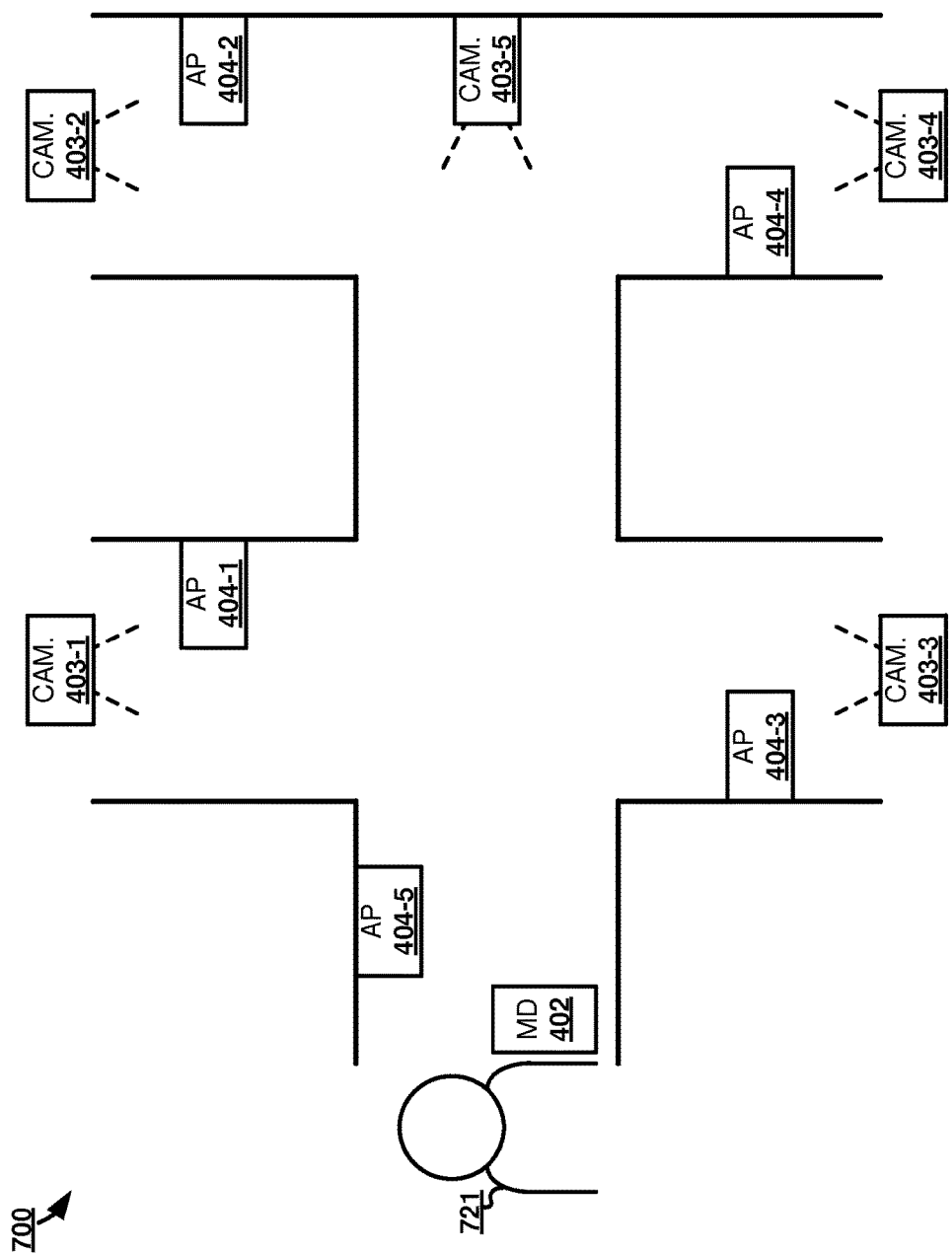
FIG. 7 illustrates a surveillance environment in an operational scenario of intelligently presenting surveillance information on a mobile device.

FIG. 7 illustrates a top down floor layout view example of how cameras 403 and access points 404 of environment 400 may be laid out in at least a portion of a premises 700. In particular, cameras 403-(1-4) each capture video of a room or hallway offshoot from a hallway captured by camera 403-5. Wireless access points 404-(1-4) provide wireless network access to network 406 in the locations covered by cameras 403-(1-4), respectively. Likewise, wireless access point 404-5 provides wireless network access to network 406 in the hallway captured by camera 403-5.

User 721 is in possession of mobile device 402 in this example and is currently illustrated as being in the hallway covered by camera 403-5 and access point 404-5. Accordingly, during operations 500 and 600 above, wireless device 402 may be determined to be located in the hallway based on device 402 having communicated with surveillance system 401 through access point 404-5. Video streams from cameras 403 are then selected by surveillance system 401 based on the fact that mobile device 402 is located at that position.

Figure 8:
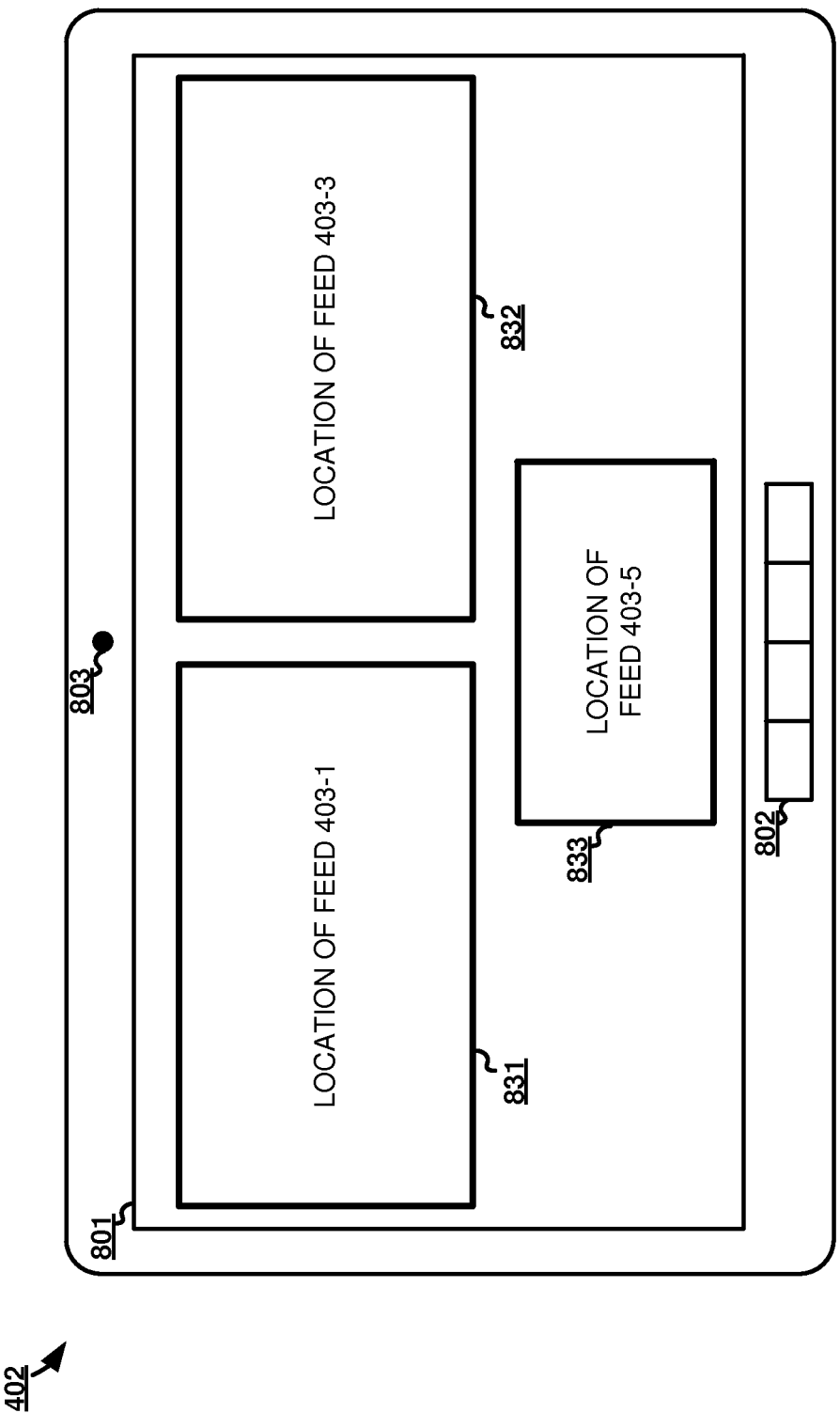
FIG. 8 illustrates a mobile device in an operational scenario of intelligently presenting surveillance information on a mobile device.

FIG. 8 illustrates an example of mobile device 402 that user 721 may be viewing at the illustrated position in the hallway. Mobile device 402 in this example includes a display screen 801, hardware buttons 802, and user facing video camera 803, although mobile device 402 may include different or additional components and may take other form factors than that shown.

As noted above, surveillance system 401 determines that mobile device 402 is located in the hallway, as shown in FIG. 7. More specifically, for the purposes of the example in FIG. 8, surveillance system 401 is able to distinguish that mobile device 401 is closer to the areas captured by cameras 403-1 and 403-3 than it is to the areas captured by cameras 403-2 and 403-4. Moreover, surveillance system 401 determines that mobile device 402 is moving from left to right in relation to premises 700 shown in FIG. 7.

Accordingly, display 801 is instructed in this example to display 3 video streams received from surveillance system 401. In particular, based on mobile device 402's location, surveillance system 401 selected the video streams from cameras 403-1, 403-2, and 403-5 for transfer to mobile device 402. The video streams from 403-1 and 403-3 are more prominently displayed in windows 831 and 832, respectively, since they show video of location that may not be viewable by user 721 (e.g. around the corner from user 721's position or through a door). The streams from cameras 403-1 and 403-2 are selected over due to mobile device 402 (and user 721 by association) being closer to the locations captured in those streams than to location captured of locations by cameras 402-2 and 403-4. Likewise, the location captured by camera 403-5 is displayed in a smaller window 833 since that is the current location of user 721 and it is less likely that user 721 is unable to see much of their current location.

As user 721 moves about premises 700 with mobile device 402, the location of mobile device 402 is updated with surveillance system 401 and the selected video streams for display is also updated by surveillance system 401. For example, if user 721 moves into the location captured by camera 403-1, then mobile device 402 begins communicating with surveillance system 401 using access point 404-1, which indicates device 402's location. Accordingly, the video feed from camera 403-1 may be moved into smaller window 833 since it is now the current location of device 402. Likewise, the video stream from camera 403-5 may be moved up to window 831 so that user 721 can better view the hallway from which they came.

It should be understood, that other schemes for determining a number of video streams that should be displayed on device 402, the size of those streams, highlighting of the streams, etc. may be used instead. For example, device 402 may in some cases be able to display streams from all 5 of cameras 403.

Additionally, in some embodiments, other environmental sensors may be located in the locations captured by each of cameras 403. The sensors may include temperature sensors, smoke sensors, motion sensors, or some other type of sensor capable of measuring information that may be relevant to a user—including combinations thereof. These sensors may be displayed on device 402 in association with video streams of the location wherein the sensor is located. This provides user 721 with information that may not otherwise be gleaned from video. For example, a person may be hiding in a room captured by one of cameras 403 but cannot be seen in the captured video. A motion sensor may be able to sense that person's movement and indicate that movement to user 721.

Figure 9:
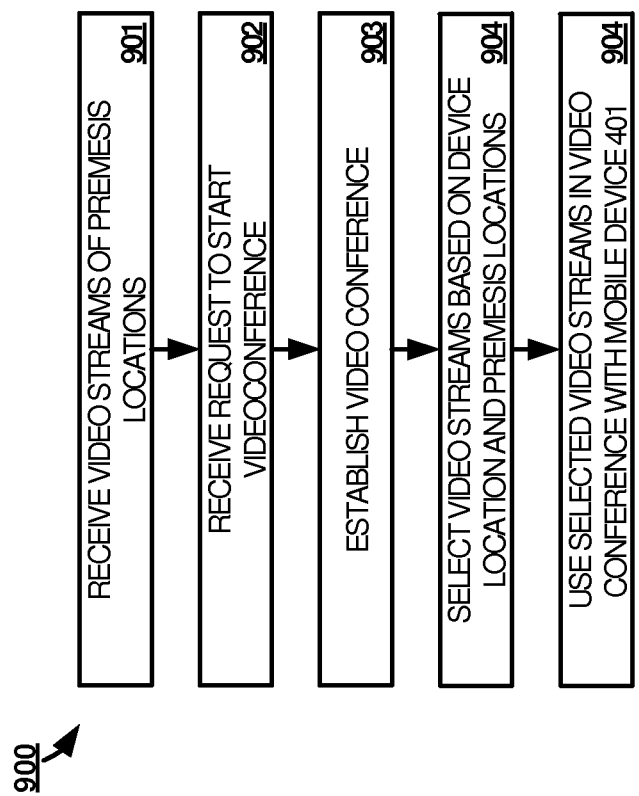
FIG. 9 illustrates a method for intelligently presenting surveillance information on a mobile device.

FIG. 9 illustrates operation 900 of surveillance environment 400 to intelligently present surveillance information on a mobile device. In the example of FIG. 9, surveillance system 401 is a videoconferencing system. The videoconferencing system may be a SIP based communication system although other system types may also be used. In this embodiment, mobile device 401 need only be configured to act as a user agent of videoconferencing system in order to receive video streams (e.g. executed an application that instructs mobile device 402 to communicate with surveillance system 401).

In operation 900, surveillance system 401 receives video streams from cameras 403 (step 901). This receipt of video streams may begin before or after a request to start a videoconference is received from device 402 (step 902). The request to start a videoconference may be made in the same way that any other videoconference would. In response to receiving the request, surveillance system 401 establishes a videoconference with mobile device 402 (step 903). Surveillance system 401 further determines which of the video streams should be transferred to mobile device 402 based on device 402's location as described elsewhere herein (step 904). Each of the selected video streams are then sent by surveillance system 401 to mobile device 402 as respective participant video streams in the videoconference and mobile device 402 likewise displays those video streams as though they are participants in the video conference (step 904). Advantageously, in this example, mobile device 402 does not require any modification as a user agent to a videoconferencing system in order to intelligently present real-time surveillance video streams. That is, as far as mobile device 402 is concerned, the video streams received from surveillance system 401 are no different than participant video streams in a videoconference.

Additionally, in some videoconferencing systems, the size of the video for various participants, or whether video of certain participants is shown at all, is governed by the videoconferencing system. For example, a videoconferencing system may direct a device to display a participant video stream of a currently speaking participant in a larger window than other participant video. Also, if enough participants are on a videoconference, then a system may direct that only video of the participants that spoke most recently be transferred to and displayed by the device. These same mechanisms may be used by surveillance system 401 to manage which video streams are transferred to mobile device 402 and which video streams should be displayed more prominently.

Moreover, if communication with command system 405 is desired, then one of the video streams may include a video stream of users located at command system 405. In those examples, communications from mobile device 402 to command system 405 are also supported. Similarly, if equipment at locations captured by cameras 403 supports audio or visual communications from mobile device 402, then two way communications may also be supported for those video streams. For example, if people are at the location of one of the video streams, then the user of device 402 may speak to those people through the videoconference.

Figure 10:
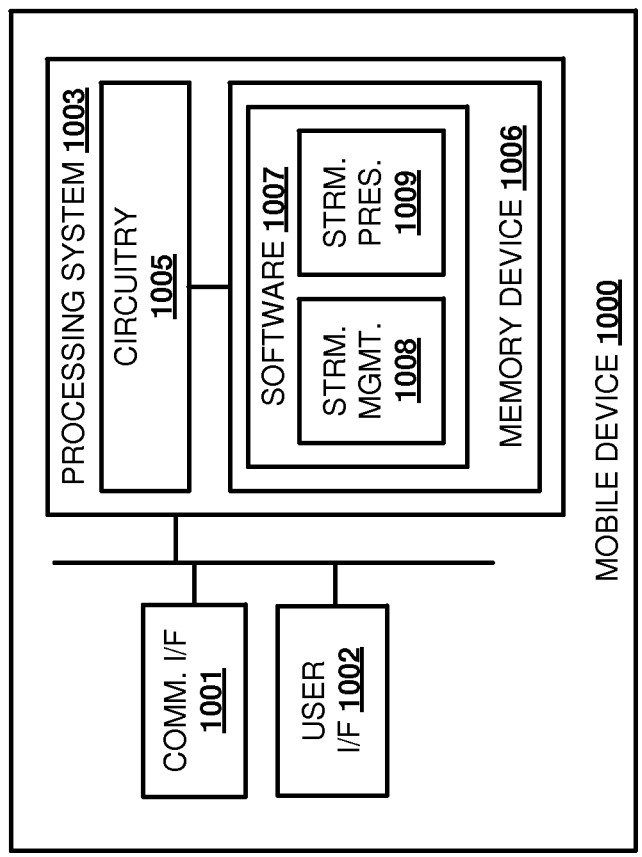
FIG. 10 illustrates a mobile device in an operational scenario of intelligently presenting surveillance information on a mobile device.

FIG. 10 illustrates mobile device 1000. Mobile device 1000 is an example of mobile devices 102 and 402, although devices 102 and 402 could use alternative configurations. Mobile device 1000 comprises wireless communication interface 1001, user interface 1002, and processing system 1003. Processing system 1003 is linked to wireless communication interface 1001 and user interface 1002. Processing system 1003 includes processing circuitry 1005 and memory device 1006 that stores operating software 1007. Mobile device 1000 may include other well-known components such as a battery and enclosure that are not shown for clarity. Mobile device 1000 may be a telephone, tablet, computer, e-book, mobile Internet appliance, media player, game console, or some other communication apparatus—including combinations thereof.

Communication interface 1001 comprises components that communicate over communication links, such as network cards, ports, RF transceivers, processing circuitry and software, or some other communication devices. Communication interface 1001 may be configured to communicate over metallic, wireless, or optical links. Communication interface 1001 may be configured to use TDM, IP, Ethernet, optical networking, wireless protocols, communication signaling, or some other communication format—including combinations thereof.

User interface 1002 comprises components that interact with a user to receive user inputs and to present media and/or information. User interface 1002 may include a speaker, microphone, buttons, lights, display screen, touch screen, touch pad, scroll wheel, communication port, or some other user input/output apparatus—including combinations thereof. User interface 1002 may be omitted in some examples.

Processing circuitry 1005 comprises microprocessor and other circuitry that retrieves and executes operating software 1007 from memory device 1006. Memory device 1006 comprises a non-transitory storage medium, such as a disk drive, flash drive, data storage circuitry, or some other memory apparatus. Processing circuitry 1005 is typically mounted on a circuit board that may also hold memory device 1006 and portions of communication interface 1001 and user interface 1002. Operating software 1007 comprises computer programs, firmware, or some other form of machine-readable processing instructions. Operating software 1007 includes stream management module 1008 and stream presentation module 1009. Operating software 1007 may further include an operating system, utilities, drivers, network interfaces, applications, or some other type of software. When executed by processing circuitry 1005, operating software 1007 directs processing system 1003 to operate mobile device 1000 as described herein.

In particular, stream management module 1008 directs processing system 1003 to receive at least one video stream from a surveillance system, wherein the surveillance system selects the at least one video stream from video streams, each comprising video captured of a location of a premises under surveillance, based on a device location of the mobile device and the location captured in the video of each video stream. Stream presentation module 1009 directs processing system 1003 to display the at least one video stream to a user.

Figure 11:
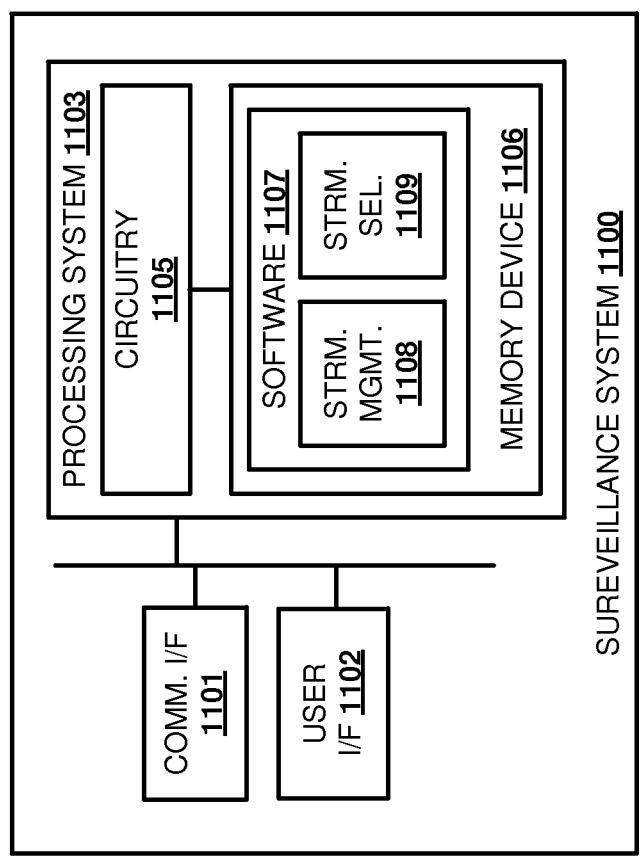
FIG. 11 illustrates a surveillance system in an operational scenario of intelligently presenting surveillance information on a mobile device.

FIG. 11 illustrates surveillance system 1100. Surveillance system 1100 is an example of surveillance systems 101 and 401, although systems 101 and 401 may use alternative configurations. Surveillance system 1100 comprises communication interface 1101, user interface 1102, and processing system 1103. Processing system 1103 is linked to communication interface 1101 and user interface 1102. Processing system 1103 includes processing circuitry 1105 and memory device 1106 that stores operating software 1107.

Communication interface 1101 comprises components that communicate over communication links, such as network cards, ports, RF transceivers, processing circuitry and software, or some other communication devices. Communication interface 1101 may be configured to communicate over metallic, wireless, or optical links. Communication interface 1101 may be configured to use TDM, IP, Ethernet, optical networking, wireless protocols, communication signaling, or some other communication format—including combinations thereof.

User interface 1102 comprises components that interact with a user. User interface 1102 may include a keyboard, display screen, mouse, touch pad, or some other user input/output apparatus. User interface 1102 may be omitted in some examples.

Processing circuitry 1105 comprises microprocessor and other circuitry that retrieves and executes operating software 1107 from memory device 1106. Memory device 1106 comprises a non-transitory storage medium, such as a disk drive, flash drive, data storage circuitry, or some other memory apparatus. Operating software 1107 comprises computer programs, firmware, or some other form of machine-readable processing instructions. Operating software 1107 includes stream management module 1108 and stream selection module 1109. Operating software 1107 may further include an operating system, utilities, drivers, network interfaces, applications, or some other type of software. When executed by circuitry 1105, operating software 1107 directs processing system 1103 to operate surveillance system 1100 as described herein.

In particular, stream management module 1108 directs processing system 1103 to receive video streams each comprising video captured of a location of a premises under surveillance. Stream selection module 1109 directs processing system 1003 to determine a device location of the mobile device in the premises and select at least one video stream of the video streams based on the device location and the location captured in the video of each video stream. Stream management module 1108 directs processing system 1103 to transfer the at least one video stream to the mobile device.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating surveillance system to intelligently present surveillance information on a mobile device, the method comprising:
receiving video streams each comprising video captured of a location of a premises under surveillance;
determining a device location of the mobile device in the premises, including determining a first location of the premises towards which the mobile device is moving;
selecting at least one video stream of the video streams based on the device location and the location of the premises captured in the video of each video stream, wherein the at least one video stream includes one or more of the video streams that is determined to comprise video captured of the first location that includes areas of the first location that cannot be seen by a user moving the mobile device; and
transferring the at least one video stream to the mobile device for display by the mobile device at least more prominently than one or more other ones of the video streams.

2. The method of claim 1, further comprising:
determining a second device location of the mobile device in the premises;
selecting at least one second video stream of the video streams based on the second device location and the location captured in the video of each video stream; and
transferring the at least one second video stream to the mobile device.

3. The method of claim 1, further comprising:
receiving environmental sensor information for locations captured in video of each of the at least one video streams; and
transferring the environmental information to the mobile device.

4. The method of claim 1, wherein determining the device location comprises:
determining a wireless access point at the premises to which the mobile device is connected, wherein a location of the wireless access point indicates the device location.

5. The method of claim 1, wherein:
determining the device location includes determining a second location of the premises from which the mobile device moved; and
selecting the at least one video stream comprises determining which first ones of the video streams comprise video captured of the second location.

6. The method of claim 5, further comprising:
transferring to the mobile device an indication that a one video stream of the first ones of the video streams is to be displayed larger than other displayed ones of the at least one video stream.

7. The method of claim 1, wherein the at least one video stream further includes a first video stream comprising video captured of the device location.

8. The method of claim 1, further comprising:
displaying the at least one video stream at a separate location away from the device location.

9. The method of claim 1, wherein the mobile device comprises a session initiation protocol (SIP) user agent and the at least one video stream is transferred to the SIP user agent.

10. A surveillance system for intelligently presenting surveillance information on a mobile device, the surveillance system comprising:
a communication interface configured to receive video streams each comprising video captured of a location of a premises under surveillance;
a processing system configured to determine a device location of the mobile device in the premises, including determining a first location of the premises towards which the mobile device is moving, and select at least one video stream of the video streams based on the device location and the location of the premises captured in the video of each video stream, wherein the at least one video stream includes one or more of the video streams that is determined by the processing system to comprise video captured of the first location that includes areas of the first location that cannot be seen by a user moving the mobile device; and
the communication interface further configured to transfer the at least one video stream to the mobile device for display by the mobile device at least more prominently than one or more other ones of the video streams.

11. The surveillance system of claim 10, further comprising:
the processing system configured to determine a second device location of the mobile device in the premises and select at least one second video stream of the video streams based on the second device location and the location captured in the video of each video stream; and
the communication interface configured to transfer the at least one second video stream to the mobile device.

12. The surveillance system of claim 10, further comprising:
a sensor interface configured to receive environmental sensor information for locations captured in video of each of the at least one video streams; and
the communication interface configured to transfer the environmental information to the mobile device.

13. The surveillance system of claim 10, wherein the processing system configured to determine the device location comprises:
the processing system configured to determine a wireless access point at the premises to which the mobile device is connected, wherein a location of the wireless access point indicates the device location.

14. The surveillance system of claim 10, further comprising:
the processing system configured to determine the device location includes determining a second location of the premises from which the mobile device is moving; and
wherein the processing system configured to select the at least one video stream comprises the processing system configured to determine which first ones of the video streams comprise video captured of the second location.

15. The surveillance system of claim 14, further comprising:
the communication interface configured to transfer to the mobile device an indication that a one video stream of the first ones of the video streams is to be displayed larger than other displayed ones of the at least one video stream.

16. The surveillance system of claim 10, wherein the at least one video stream further includes a first video stream comprising video captured of the device location.

17. The surveillance system of claim 10, further comprising:

a display at a separate location away from the device location configured to display the at least one video stream.

18. The surveillance system of claim 10, wherein the mobile device comprises a session initiation protocol (SIP) user agent and the at least one video stream is transferred to the SIP user agent.

19. The surveillance system of claim 10, further comprising:
the mobile device configured to receive the at least one video stream and display the at least one video stream.

20. A method of operating a mobile device to intelligently present surveillance information, comprising:
receiving at least one video stream from a surveillance system, wherein the surveillance system selects the at least one video stream from video streams, each comprising video captured of a location of a premises under surveillance, based on a device location of the mobile device and the location captured in the video of each video stream, wherein the at least one video stream includes one or more of the video streams that is determined by the surveillance system to comprise video captured of a first location of the premises towards which the mobile device is moving that includes areas of the first location that cannot be seen by a user moving the mobile device; and
displaying the at least one video stream to a user at least more prominently than one or more other ones of the video streams.

* * * * *